United States Patent
Seo et al.

(10) Patent No.: US 8,881,198 B2
(45) Date of Patent: Nov. 4, 2014

(54) METHOD FOR SIMULTANEOUSLY PROVIDING DVB-H AND STREAMING SERVICES IN A PORTABLE TERMINAL

(75) Inventors: Eun-Jung Seo, Gyeongsangbuk-do (KR); Jeong-Wook Seo, Daegu (KR); Hak-Sung Lyou, Gyeongsangbuk-do (KR); Bryan Kim, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 364 days.

(21) Appl. No.: 12/828,360

(22) Filed: Jul. 1, 2010

(65) Prior Publication Data

US 2011/0004903 A1    Jan. 6, 2011

(30) Foreign Application Priority Data

Jul. 3, 2009   (KR) .................. 10-2009-0060729

(51) Int. Cl.
| | | |
|---|---|---|
| G06F 3/00 | (2006.01) | |
| G06F 13/00 | (2006.01) | |
| H04N 5/445 | (2011.01) | |
| H04N 7/16 | (2011.01) | |
| H04N 21/488 | (2011.01) | |
| H04N 21/472 | (2011.01) | |
| H04N 21/462 | (2011.01) | |
| H04N 21/414 | (2011.01) | |
| H04N 21/643 | (2011.01) | |

(52) U.S. Cl.
CPC ........... H04N 5/445 (2013.01); H04N 21/4882 (2013.01); H04N 21/47202 (2013.01); H04N 21/4622 (2013.01); H04N 21/41407 (2013.01); H04N 21/64315 (2013.01)

USPC .................................. 725/48; 725/54; 725/62

(58) Field of Classification Search
USPC ............... 725/37, 48, 54, 62; 455/3.01, 3.03, 455/3.04, 3.05, 3.06
See application file for complete search history.

(56) References Cited

U.S. PATENT DOCUMENTS

| | | | |
|---|---|---|---|
| 7,711,315 B2 * | 5/2010 | Aaltonen et al. ............. 455/3.02 |
| 2006/0294205 A1 * | 12/2006 | Aaltonen et al. ............. 709/219 |
| 2007/0107013 A1 * | 5/2007 | Seppala et al. .................. 725/39 |
| 2007/0123244 A1 | 5/2007 | Paila |

(Continued)

FOREIGN PATENT DOCUMENTS

| | | |
|---|---|---|
| EP | 1753166 A2 | 2/2007 |
| EP | 1868382 A2 | 12/2007 |
| EP | 2028848 A1 | 2/2009 |

OTHER PUBLICATIONS

Steck, Chris; "Delivering Total Mobile TV: Combining Streaming and Broadcast for a Complete Mobile Television Solution;" Apr. 2006; Rtrvd from internet: http://docs.real.com/docs/industries/DeliveringTotalMobileTV.pdf [Retrieved on May 20, 2008]; XP002482031.

*Primary Examiner* — John Schnurr
(74) *Attorney, Agent, or Firm* — Cha & Reiter, LLC

(57) ABSTRACT

A method for providing Digital Video Broadcasting-Handheld (DVB-H) and streaming services in a portable terminal includes receiving Electronic Service Guide (ESG) data of DVB-H and displaying a DVB-H channel, confirming whether a field associated with a streaming channel is present in a reserved field of the received ESG data, and if the associated field is present in the ESG data, displaying a steaming channel corresponding to the associated field together with the DVB-H channel.

22 Claims, 6 Drawing Sheets

(56) References Cited

U.S. PATENT DOCUMENTS

2007/0275762 A1* 11/2007 Aaltone et al. ............... 455/566
2008/0163322 A1 7/2008 Park et al.
2009/0094644 A1 4/2009 Jung et al.
2010/0169504 A1* 7/2010 Gabin et al. ................. 709/231
2011/0093880 A1* 4/2011 Paila et al. ..................... 725/25

* cited by examiner

FIG.2A

| Name | Type | Category | Cardinality | Description | Data Type |
|---|---|---|---|---|---|
| UnicastService Delivery | E2 | NM/TM | 0..N., | This element indicates which server and/or protocol is used for delivery of service over Interaction Channel. Contains the following sub-elements AccessServerURL | E2 |
| AccessServer URL | E3 | NM/TM | 0..N., | Server URL from which the terminal can receive the service via the Interaction Network. For example, AccessServerURL can be an HTTP URL pointing to downloadable content, or an RTSP URL pointing to a streaming server for stating a streaming session. Contains the following attribute. type | anyURL |

FIG.2B

| Name | Type | Category | Cardinality | Description | Data Type |
|---|---|---|---|---|---|
| Extension | E1 | NM/TM | 0..N., | Additional information related to this fragment Contains the following attribute url Contains following sub-element Description | |
| url | A | NM/TM | 1 | URL containing additional information related to this fragment | anyURL |

FIG.3A

```
<Content baseCID="445281" globalContentID="445281" id="urn:castlabs.com:content:445281"
version="0" xmlns="urn:oma:xml:bcast:sg:fragments:1.0">
    <ServiceReference idRef="urn:castlabs.com:service:25" weight="0"/>
    <Name xml:lang="de">FM4-Reality Check</Name>
    <Description xml:lang="de"/>
    <StartTime>2008-06-27T10:00:00.000Z</StartTime>
    <EndTime>2008-06-27T12:00:00.000Z</EndTime>
    <Length>PT7200S</Length>
310 ⎰  <Extension>
    ⎱  311 ⎰ <url>rtsp://10.50.255.83/beauty.3gp</url>
           ⎱ <Description>Beauty</Description>
       </Extension>
</Content>
```

FIG.3B

```
<!DOCTYPE HTML PUBLIC "-//W3C//DTD HTML 4.01 Transitional//EN">
<html><head>
<title>ANNA Webserver</title>
...
<ul>
320 ⎰ <li><a href="rtsp://10.50.255.83/beauty.3gp">Beauty</a> (3gp, 12kbits, 5:00min)</li>
    ⎨ <li><a href="rtsp://10.50.255.83/icehockey_16kbits_30min.3gp">icehockey</a> (3gp, 16kbits, 30min)</li>
    ⎱ <li><a href="rtsp://10.200.8.226/wm2006-112k.3gp">wm2006-112k.3gp</a></li>
...
```

METHOD FOR SIMULTANEOUSLY PROVIDING DVB-H AND STREAMING SERVICES IN A PORTABLE TERMINAL

CLAIM OF PRIORITY

This application claims the benefit under 35 U.S.C. §119 (a) of a Korean Patent Application filed in the Korean Intellectual Property Office on Jul. 3, 2009 and assigned Serial No. 10-2009-0060729, the entire disclosure of which is hereby incorporated by reference.

BACKGROUND OF THE INVENTION

1. Field of the Invention

The present invention relates generally to a method of providing broadcast and unicast services in a portable terminal, and more particularly, to a method for simultaneously providing broadcast and unicast services without any complicated procedure.

2. Description of the Related Art

With a rapid advancement in a mobile communication environment, the scope of a portable terminal application which has been traditionally focused on voice services is diversifying. For example, a digital multimedia broadcast such as Digital Video Broadcasting-Handheld (DVB-H) are now generally available and streaming services, such as video clip, broadcast content and media content, are becoming increasingly popular.

Recently, new portable terminals enable users to simultaneously receive a broadcast service (e.g. DVB-H) and a unicast service (e.g. streaming service) through a single portable terminal.

However, since an application for providing a broadcast service such as DVB-H is independent application from a unicast service such as a streaming service, it is inconvenient for users to use both services. Accordingly, users of portable terminals do not make a full usage of the DVB-H broadcast and streaming services.

As one example, if the DVB-H broadcast service is interrupted by the unstable reception of a DVB-H broadcast signal while watching DVB-H broadcast, a user has to end the DVB-H application currently being executed and must search a streaming channel by driving an application for a streaming service to continue the service.

SUMMARY OF THE INVENTION

An aspect of the present invention is to address at least the above-mentioned problems and/or disadvantages and to provide at least the advantages described below.

Accordingly, an aspect of the present invention provides a method for displaying a streaming channel within a DVB-H application and simultaneously providing a DVB-H broadcast service and a streaming service.

In accordance with an aspect of exemplary embodiments of the present invention, a method for providing DVB-H and streaming services in a portable terminal includes receiving ESG data of DVB-H and displaying a DVB-H channel, confirming whether a field associated with a streaming channel is present in a reserved field of the received ESG data, and if the associated field is present in the ESG data, displaying a steaming channel corresponding to the associated field together with the DVB-H channel.

In accordance with another aspect of exemplary embodiments of the present invention, a method for providing DVB-H and streaming services in a portable terminal includes, if it is confirmed that a DVB-H broadcast signal is not received, stopping the provision a broadcast service of a DVB-H channel and generating an alert message indicating that the broadcast service of the DVB-H channel is stopped, confirming whether information about a streaming channel associated with the service-stopped DVB-H channel is present in a reserved field of ESG data, and obtaining information about the service-stopped DVB-H channel through the confirmation, and receiving and displaying the streaming channel associated with the service-stopped DVB-H channel.

BRIEF DESCRIPTION OF THE DRAWINGS

The above and other aspects, features and advantages of certain exemplary embodiments of the present invention will be more apparent to those skilled in the art from the following description taken in conjunction with the accompanying drawings, in which:

FIGS. 2A and 2B are diagrams illustrating ESG data;

FIGS. 3A and 3B are diagrams illustrating ESG data and a WAP page according to an exemplary embodiment of the present invention;

DETAILED DESCRIPTION OF THE INVENTION

Reference will now be made in detail to the exemplary embodiments of the present invention with reference to the accompanying drawings. The following detailed description includes specific details in order to provide a thorough understanding of the present invention. However, it will be apparent to those skilled in the art that the present invention may be practiced without such specific details.

Figure 1:
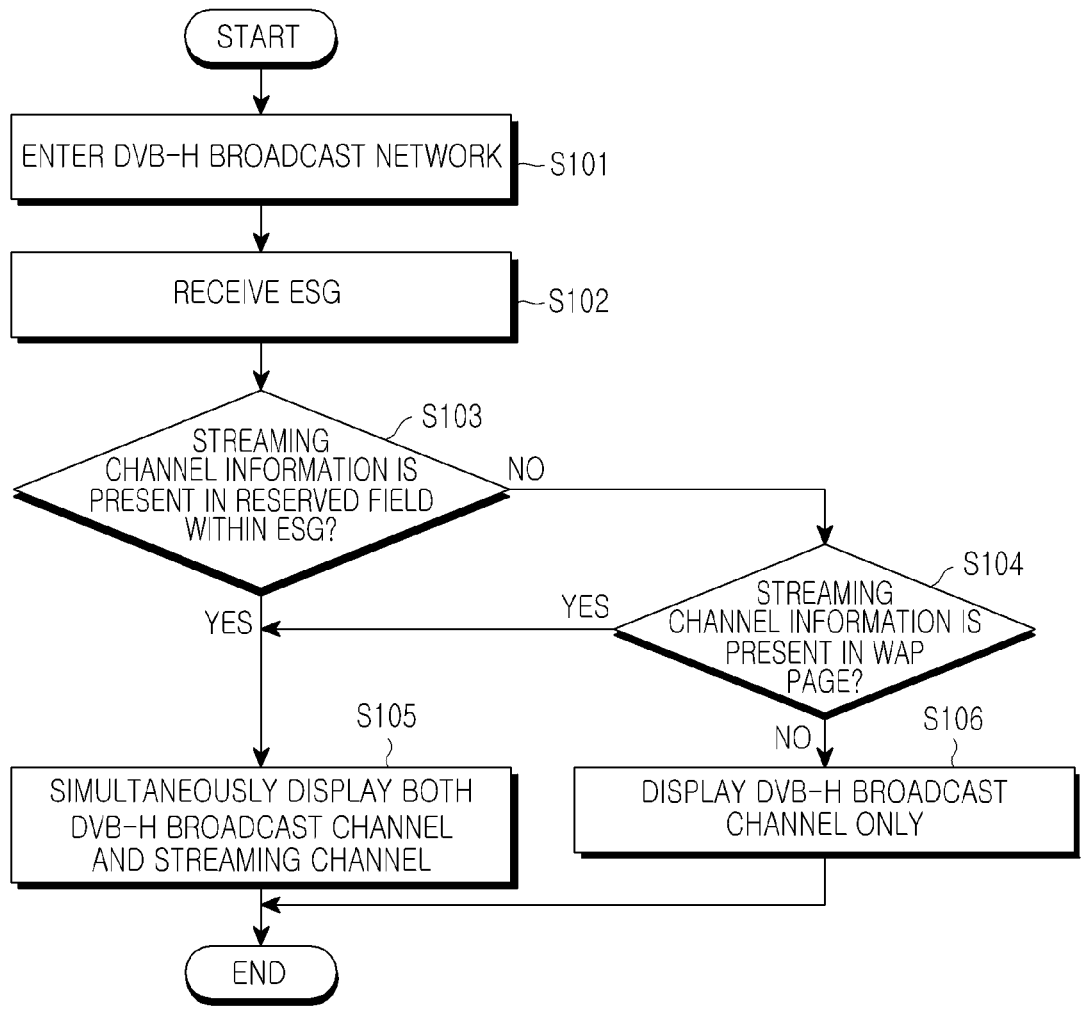
FIG. 1 is a flow chart illustrating a process for simultaneously displaying a DVB-H broadcast channel and a streaming channel according to an exemplary embodiment of the present invention.

A process for simultaneously displaying a DVB-H broadcast channel and a streaming channel according to an exemplary embodiment of the present invention is illustrated in FIG. 1.

Referring to FIG. 1, upon receiving a request for a DVB-H broadcast from a user, a portable terminal enters a DVB-H broadcast network in step S101 and receives an Electronic Service Guide (ESG) for information relating to a DVB-H broadcast channel in step S102. Next, the portable terminal confirms whether streaming channel information is present in a prescribed reserved field within the ESG in step S103.

According to the exemplary embodiment of the present invention, the streaming channel information is provided in a reserved field of the ESG. The reserved field of the ESG may be a <UnicastServiceDelivery> field of an access fragment as shown in FIG. 2A or an <Extension> field of a Service/Content fragment as shown in FIG. 2B.

It is assumed that the streaming channel information provided in the reserved field of the ESG is previously inserted and transmitted by broadcast providers, mobile communication providers or content providers. In the embodiment, streaming channel information associated with a DVB-H channel may be inserted. However, according to a modified embodiment of the present invention, streaming channel information which can be used in a commercial advertisement or other information may be inserted even though it is not associated with the DVB-H channel.

Therefore, the portable terminal confirms whether the streaming channel information is present in the <UnicastServiceDelivery> field or <Extension> field of the ESG through parsing of the ESG. In the exemplary embodiment of the present invention, the portable terminal may confirm whether the streaming channel information is present by confirming whether there is a syntax of a Real-Time Streaming Protocol (RTSP) associated with the streaming channel in the <UnicastServiceDelivery> field or <Extension> field.

As an illustrative example, the portable terminal checks an <Extension> field of ESG data to acquire information about a name (in this example, 'beauty') and an access link (in this example, rtsp://10.50.255.83/beauty.3gp) of an inserted streaming channel, as indicated by reference numerals 310 and 311 in FIG. 3A.

If it is confirmed that the streaming channel information is not present in the reserved field of the ESG in step S103, the portable terminal confirms whether the streaming channel information is present in a preset Wireless Application Protocol (WAP) page in step S104.

According to a modified embodiment of the present invention, the streaming channel information may be inserted in the preset WAP page instead of the reserved field of the ESG. Therefore, the portable terminal may obtain the streaming channel information inserted in the WAP page by parsing the preset WAP page. For example, as indicated by reference numeral 320 in FIG. 3B, the portable terminal parses syntaxes within the preset WAP page to acquire an access link and name of each streaming channel inserted together with a syntax of an RTSP. That is, the portable terminal obtains an access link 'rtsp://10.50.255.83/beauty.3gp' and a name 'Beauty', an access link 'rtsp://10.50.255.83/icehockey_16 kbits_30 min.3gp' and a name 'Icehockey', and an access link 'rtsp://10.200.8.226/wm2006-112k.3gp' and a name 'wm2006-112k.3gp' of streaming channels.

According to the modified embodiment of the present invention, the preset WAP page may be replaced by an additional database including the streaming channel information. In more detail, broadcast providers or portable terminal manufacturers may selectively set a database which is to be referred to when an application for providing a DVB-H broadcast service is driven and may insert the streaming channel information, which is to be displayed together with the DVB-H channel, in the database.

The preset WAP page may be changed later on according to a modified embodiment of the present invention. For example, broadcast providers or mobile communication providers may add (or insert) a prescribed tag (e.g. <DVB-H WAP>) to a new WAP page through a transmission method such as a Short Message Service (SMS) so that the portable terminal can refer to an added access link and name.

As stated above, the portable terminal acquires the streaming channel information by parsing the database upon driving a DVB-H broadcast application, thereby simultaneously displaying both information about DVB-H channels through the ESG and information about streaming channel through the database.

If the portable terminal cannot access a DVB-H broadcast network for a prescribed time period (e.g. if a broadcast signal is not received), the portable terminal may display only a list of streaming channels through parsing of the WAP page and may provide a streaming service to users. The portable terminal may check the state of the DVB-H broadcast network continuously or at prescribed intervals. If the DVB-H broadcast network is searched, the portable terminal receives the ESG to display a list of DVB-H channels so that users can use a DVB-H service in addition to the streaming service.

If the streaming channel information is obtained in step S103 or S104, the portable terminal simultaneously displays the DVB-H broadcast channel and the streaming channel in step S105.

Namely, the portable terminal simultaneously displays, on one screen, the DVB-H broadcast channel information through the ESG received in step S102 and the streaming channel information acquired in step S103 or S104. According to a modified embodiment of the present invention, the portable terminal may additionally display a list of streaming files stored therein. In this case, DVB-H broadcast channels, streaming channels, and stored streaming files may be distinguished from each other by additional icons.

Figure 4:
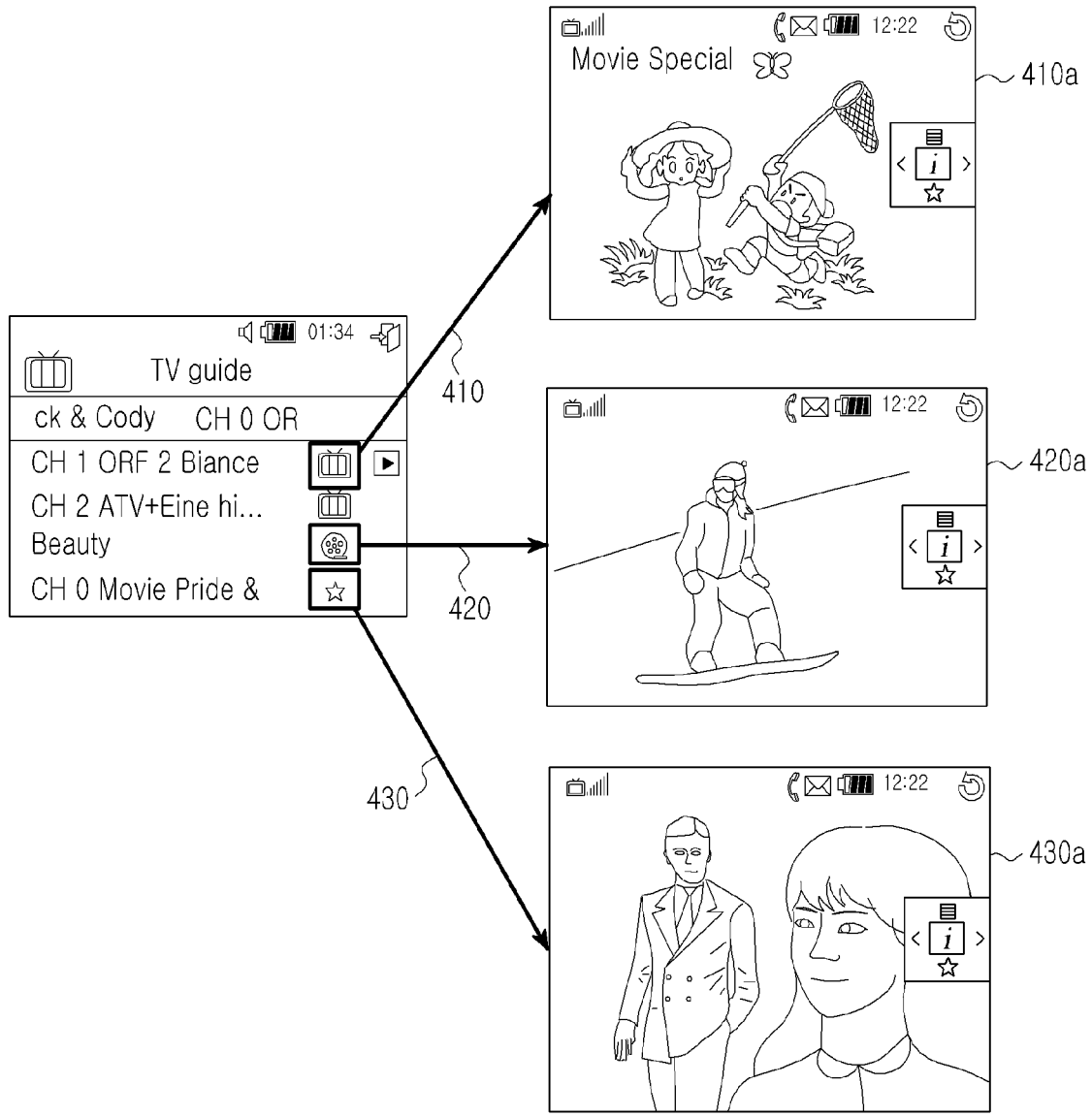
FIG. 4 is a diagram illustrating an example process of FIG. 1.

For example, as illustrated in FIG. 4, a list of the DVB-H broadcast channels indicated by reference numeral 410, a list of the stored streaming files indicated by reference numeral 420 and a list of the streaming channels indicated by reference numeral 430 may be displayed on one screen. If any one of them is selected, a screen denoted by reference numeral 410a, 420a or 430a may be output through the processing of broadcast data or streaming data.

Thus, the portable terminal can provide, through one screen (or application), both the DVB-H broadcast service and the streaming service, without an additional driving application or an additional access process through a driving screen.

Meanwhile, if the streaming channel information is not present in the preset WAP page in step S104, the portable terminal displays only the DVB-H broadcast channel in step S106.

The portable terminal may additionally provide a menu which can select the DVB-H broadcast channel or the streaming channel. Then, the portable terminal may selectively display the DVB-H broadcast channel or the streaming channel according to the selection of a user.

Figure 5:
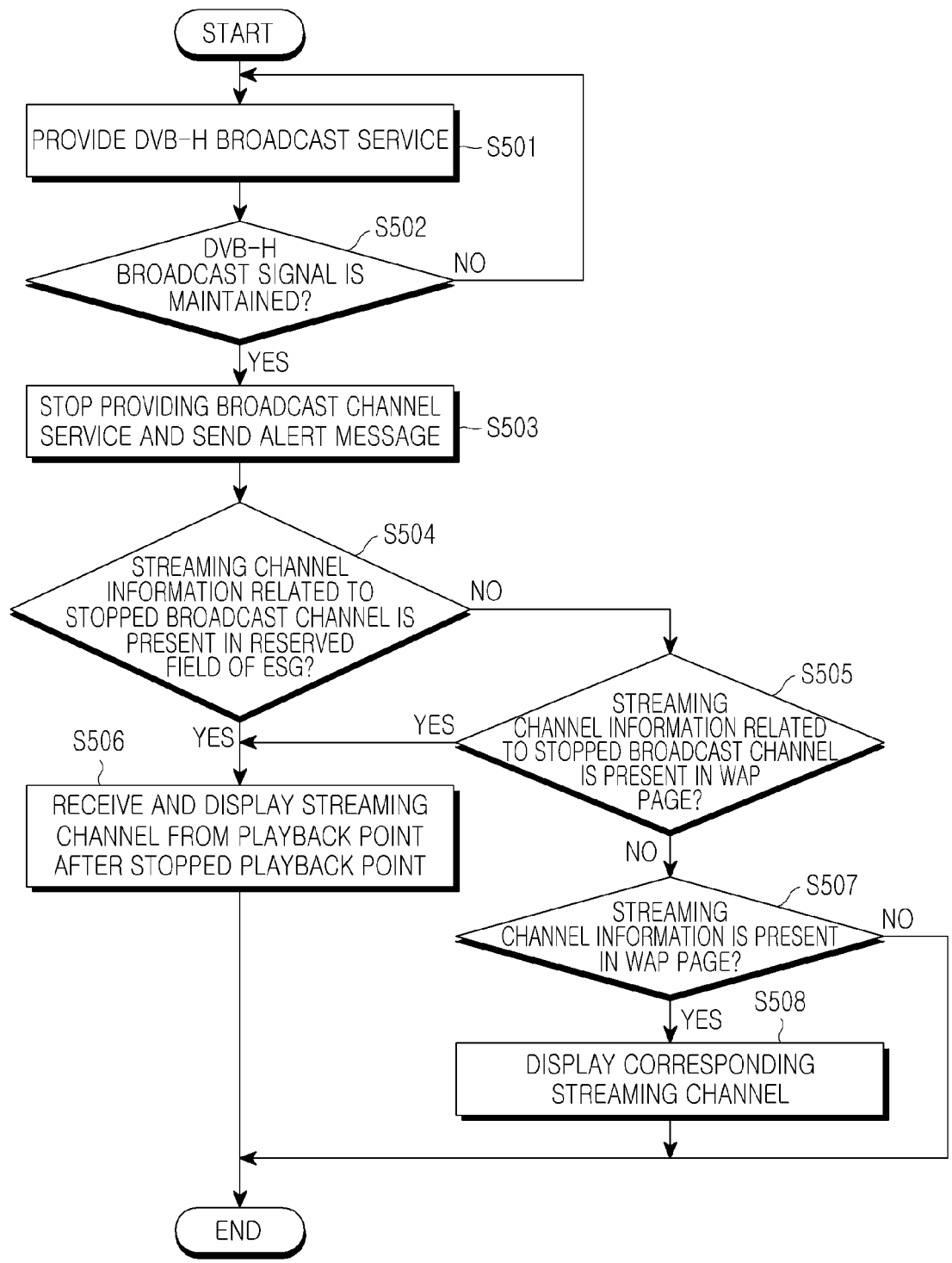
FIG. 5 is a flow chart illustrating a process for restarting a stopped DVB-H broadcast service through a streaming channel according to an exemplary embodiment of the present invention.

FIG. 5 is a flow chart illustrating a process for restarting a stopped DVB-H broadcast service through a streaming channel according to an exemplary embodiment of the present invention.

Referring to FIG. 5, while providing a broadcast service of a DVB-H channel to users in step S501, the portable terminal confirms whether a DVB-H broadcast signal is maintained in step S502. If the DVB-H broadcast signal is not maintained, the portable terminal stops providing the broadcast service of the DVB-H channel and generates an alert message to inform a user that the broadcast service of the DVB-H channel is stopped in step S503.

More specifically, the portable terminal confirms whether the DVB-H broadcast signal, which enables a user to normally receive the broadcast service of the DVB-H channel, is maintained at a level above a predetermined reception intensity. If it is confirmed that the portable terminal enters a weak electric field area (or shadow area), the portable terminal stops providing the broadcast service of the DVB-H channel through a display (comprised of an LCD or an OLED for example). Next, the portable terminal may inform the user through visual information (e.g. using the display) or audio information (e.g. using a microphone) that the broadcast service cannot be provided because the DVB-H broadcast signal is unable to be normally received.

When the DVB-H broadcast signal is not normally received and therefore the broadcast service of the DVB-H channel is stopped, the portable terminal may confirm a playback point of a multimedia service which is being provided in the service-stopped DVB-H channel.

The portable terminal confirms whether the streaming channel information associated with the service-stopped DVB-H channel is present in the reserved field of the ESG in step S504. If it is not present, the portable terminal confirms whether the streaming channel information associated with the service-stopped DVB-H channel is present in the preset WAP page in step S505.

The portable terminal confirms whether the streaming channel information associated with the service-stopped DVB-H channel in step S503 is present in a corresponding field by parsing the reserved field of the <UnicastServiceDelivery> field or the <Extension> field shown in FIG. 2.

The streaming channel information associated with to the service-stopped DVB-H channel may be information about a multimedia service which is the same as (i.e. identical to) a multimedia service provided in the service-stopped DVB-H channel or may be information about a multimedia service relating to a multimedia service provided in the service-stopped DVB-H channel. Namely, the portable terminal may confirm whether the streaming channel information in the reserved field of the ESG is identical to a multimedia service provided in the service-stopped DVB-H channel in step S503. Moreover, the portable terminal may confirm whether the streaming channel information in the reserved field of the ESG relates to a multimedia service provided in the service-stopped DVB-H channel in step S503.

For example, if a multimedia service 'A' is being provided through the DVB-H channel, the portable terminal may confirm whether the multimedia service 'A' is being provided through the streaming channel by checking the reserved field. The portable terminal may also confirm whether a multimedia service associated with the multimedia service 'A', for example, a multimedia service having the same genre, director, actor or actress as the multimedia 'A' is being provided through the streaming channel.

Accordingly, the portable terminal may confirm whether a multimedia service which is identical to or similar to the multimedia service provided through the service-stopped DVB-H channel in step S503 is provided through the streaming channel by checking the reserved field of the ESG or the preset WAP page. The preset WAP page may be replaced by an additional database in which prescribed streaming channel information is included. Namely, the portable terminal may confirm whether a multimedia service which is identical to or similar to the multimedia service provided through the service-stopped DVB-H channel is provided through the streaming channel by checking the database.

If information about the service-stopped DVB-H channel in step S503 is obtained in step S504 or S505, the portable terminal receives a corresponding streaming channel and displays it from a playback point after a stopped playback point in step S506.

The portable terminal measures, in milliseconds for example, an elapsed time from a broadcast service start time of the DVB-H channel selected by a user to a broadcast service stop time of the DVB-H channel due to non-reception (or interruption) of the DVB-H broadcast signal, receives a corresponding streaming channel from the measured elapsed time, and outputs (displays) the streaming channel to the user.

Figure 6:
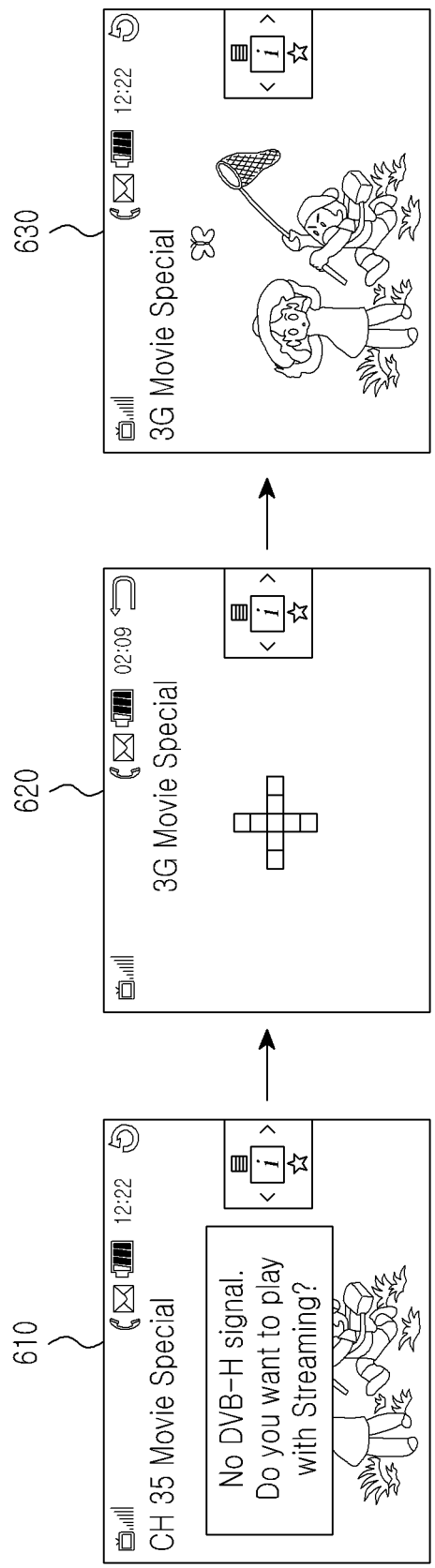
FIG. 6 is a diagram illustrating an example of the process shown in FIG. 5.

For example, assuming that a multimedia service of the service-stopped DVB-H channel in step S503 is stopped during a playback point as indicated by reference numeral 610 in FIG. 6, the portable terminal informs a user through a screen as indicated by reference numeral 620 that there is a streaming channel providing a multimedia service identical to the multimedia service of the service-stopped DVB-H channel. If playback of the streaming channel is requested by the user, the portable terminal receives and displays the multimedia service of the streaming channel from a playback point after the stopped playback point as indicated by reference numeral 630.

If the associated streaming channel is a streaming channel of a multimedia service identical to the service-stopped DVB-H broadcast channel, the portable terminal receives and outputs the associated streaming channel from a playback point after the stopped playback point. If the associated streaming channel is a streaming channel of a multimedia service relating to the service-stopped DVB-H channel, the portable terminal receives and outputs the associated streaming channel from a first playback point.

The portable terminal continues to check a DVB-H network while watching the streaming channel. If the portable terminal re-enters the DVB-H network, the portable terminal informs a user through visual information (e.g. using display) or audio information (e.g. using a microphone) that the portable terminal may return to the DVB-H channel. The portable terminal may return to the service-stopped DVB-H channel according to a user's request to continue the broadcast service of a corresponding DVB-H channel.

If the streaming channel information associated with the service-stopped DVB-H channel is not confirmed in steps 504 to 506, the portable terminal confirms whether the streaming channel information is present in the WAP page in step S507 and displays a corresponding streaming channel in step S508.

In this case, the portable terminal confirms whether the streaming channel information is present in the ESG data as well as in the WAP page. If the streaming channel information is present, the portable terminal displays a corresponding streaming channel with reference to the streaming channel information.

That is, even though the streaming channel information associated with the service-stopped DVB-H broadcast channel is not confirmed in steps S504 to S506, the portable terminal confirms and displays the streaming channel information which is not associated with the service-stopped DVB-H broadcast channel. Thus, the portable terminal causes a user to continue to use a multimedia service. In this case, the streaming channel information which is not associated with the service-stopped DVB-H broadcast channel may be set by broadcast providers, content providers, portable terminal manufacturers, or portable terminal users.

According to the exemplary embodiment of the present invention, since a DVB-H broadcast channel and a streaming channel are simultaneously displayed through one application, accessibility of multimedia by users can be improved.

Further, even though a DVB-H broadcast signal is not normally received and thus a DVB-H broadcast service is stopped, since a multimedia service provided in a DVB-H broadcast is provided through search of a streaming channel, users can continuously use the multimedia service in the DVB-H broadcast through the streaming channel.

Furthermore, even when there is no multimedia service provided in a streaming channel identical to a multimedia service provided in a DVB-H broadcast, an associated multimedia service is provided through the streaming channel so that users can select streaming services according to their preference.

Note that the above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although the exemplary embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

What is claimed is:

1. A method for providing broadcast service and streaming services in a portable terminal, comprising:
  receiving Electronic Service Guide (ESG) data of broadcast service and displaying a broadcast service channel;
  checking whether a field associated with a streaming channel is present in a reserved field of the received ESG data;
  if the associated field is present in the ESG data, displaying a list including the streaming channel corresponding to the associated field and the broadcast service channel; and
  checking a Wireless Application Protocol (WAP) page and displaying only a list of streaming channels if a broadcast signal of the broadcast service is not detected for a prescribed time period.

2. The method of claim 1, further comprising
  if the associated field is not present in the ESG data, checking whether information about the streaming channel is present in the WAP page, and displaying the checked streaming channel and the broadcast service.

3. The method of claim 2, further comprising
  selectively displaying the streaming channel corresponding to the associated field and or broadcast service channel in response to a user request.

4. The method of claim 1, wherein the reserved field is a <UnicastServiceDelivery> field or an <Extension> field of the ESG data.

5. The method of claim 1, further comprising
  selectively displaying the streaming channel corresponding to the associated field and or broadcast service channel in response to a user request.

6. The method of claim 1, further comprising halting the broadcast service of the broadcast service channel if the portable terminal is unable to receive signals via the broadcast service channel and displaying the signals via the steaming channel; monitoring a broadcast service network and providing a selection to broadcast the signals via either the broadcast service channel or the steaming channel if the portable terminal reenters the broadcast service network.

7. The method of claim 6, further comprising providing a playback point of the signals when the portable terminal is unable to receive the signals via the broadcast service channel for a subsequent replay in the streaming channel.

8. The method of claim 1, wherein the broadcast service comprises Digital Video Broadcasting-Handheld (DVB-H).

9. A method for providing broadcast service and streaming services in a portable terminal, comprising:
  receiving Electronic Service Guide (ESG) data of broadcast service and displaying a broadcast service channel;
  checking whether a field associated with a streaming channel is present in a reserved field of the received ESG data; and
  if the associated field is present in the ESG data, displaying the streaming channel corresponding to the associated field together with the broadcast service channel, and further comprising:
  if a broadcast signal of the broadcast service is not detected for a prescribed time period, checking a WAP page and displaying only a list of streaming channels.

10. The method of claim 9, further comprising
  checking a broadcast network state at prescribed intervals, if a broadcast signal of the broadcast service is received, displaying a list of broadcast service channels through the ESG data together with the list of streaming channels.

11. The method of claim 9, wherein the broadcast service comprises Digital Video Broadcasting-Handheld (DVB-H).

12. A method for providing broadcast service and streaming services in a portable terminal, comprising:
  if broadcast signal is not received, halting a broadcast service of a broadcast service channel and generating an alert message indicating that the broadcast service of the broadcast service channel is stopped;
  checking whether information about a streaming channel associated with the service-stopped broadcast service channel is present in a reserved field of Electronic Service Guide (ESG) data;
  obtaining information about the service-stopped broadcast service channel through the checking the ESG data;
  receiving and displaying the streaming channel associated with the service-stopped broadcast service channel; and
  checking a Wireless Application Protocol (WAP) page and displaying only a list of streaming channels if a broadcast signal of the broadcast service is not detected for a prescribed time period.

13. The method of claim 12, further comprising:
  checking a broadcast network of the broadcast service at prescribed intervals while receiving and displaying the streaming channel; and
  if the broadcast signal of broadcast service is received, informing a user that the broadcast signal of broadcast service is received and returning to the service-stopped broadcast service channel.

14. The method of claim 12, further comprising
  confirming whether the information about the streaming channel associated with the service-stopped broadcast service channel is present in the WAP page.

15. The method of claim 14, further comprising
  obtaining information about the service-stopped broadcast service channel through the checking the WAP page, and receiving and displaying the streaming channel associated with the service-stopped broadcast service channel.

16. The method of claim 15, further comprising:
  if the streaming channel associated with the service-stopped broadcast service channel is a streaming channel of a multimedia service identical to the service-stopped broadcast service channel, receiving and displaying the streaming channel from a playback point after a stopped point; and
  if the streaming channel associated with the service-stopped broadcast service channel is a streaming channel of a multimedia service relating to the service-stopped broadcast service channel, receiving and displaying the streaming channel from a first playback point.

17. The method of claim 14, further comprising if the information about the streaming channel associated with the service-stopped broadcast service channel is not confirmed, confirming whether the information about the streaming channel is present in the WAP page or in the reserved page of the ESG data, and displaying a corresponding streaming channel.

18. The method of claim 12, further comprising:

if the streaming channel associated with the service-stopped broadcast service channel is a streaming channel of a multimedia service identical to the service-stopped broadcast service channel, receiving and displaying the streaming channel from a playback point after a stopped point; and if the streaming channel associated with the service-stopped broadcast service channel is a streaming channel of a multimedia service relating to the service-stopped broadcast service channel, receiving and displaying the streaming channel from a first playback point.

19. The method of claim 12, further comprising if the information about the streaming channel associated with the service-stopped broadcast service channel is not received, confirming whether the information about the streaming channel is present in the WAP page or in the reserved page of the ESG data, and displaying a corresponding streaming channel.

20. The method of claim 12, wherein the reserved field is a <UnicastServiceDelivery> field or an <Extension> field of the ESG data.

21. The method of claim 12, wherein the broadcast service comprises Digital Video Broadcasting-Handheld (DVB-H).

22. The method of claim 12,wherein if the broadcast service is interrupted, displaying the streaming channel so that a portable terminal permits continuous use of a multimedia service in a particular broadcast through the streaming channel.

* * * * *

UNITED STATES PATENT AND TRADEMARK OFFICE
CERTIFICATE OF CORRECTION

PATENT NO. : 8,881,198 B2  
APPLICATION NO. : 12/828360  
DATED : November 4, 2014  
INVENTOR(S) : Eun-Jung Seo et al.

Page 1 of 1

It is certified that error appears in the above-identified patent and that said Letters Patent is hereby corrected as shown below:

In the Claims

Column 7, Claim 6, Lines 55-56 should read as follows:
--…via the streaming channel…--

Column 7, Claim 6, Line 58 should read as follows:
--…or the streaming channel…--

Column 8, Claim 12, Line 32 should read as follows:
--…the checking of the…--

Column 8, Claim 15, Line 53 should read as follows:
--…the checking of the…--

Signed and Sealed this  
Tenth Day of February, 2015

Michelle K. Lee  
*Deputy Director of the United States Patent and Trademark Office*